(12) United States Patent
Shepherd et al.

(10) Patent No.: US 12,154,376 B2
(45) Date of Patent: Nov. 26, 2024

(54) EXTRACTING FACIAL IMAGERY FROM ONLINE SESSIONS

(71) Applicant: Dell Products L.P., Round Rock, TX (US)

(72) Inventors: Michael Shepherd, Leander, TX (US); Jonathan Whitson, Oklahoma City, OK (US)

(73) Assignee: DELL PRODUCTS L.P., Round Rock, TX (US)

( * ) Notice: Subject to any disclaimer, the term of this patent is extended or adjusted under 35 U.S.C. 154(b) by 377 days.

(21) Appl. No.: 17/581,580

(22) Filed: Jan. 21, 2022

(65) Prior Publication Data

US 2023/0237837 A1 Jul. 27, 2023

(51) Int. Cl.
*G06V 40/16* (2022.01)
*G06V 30/10* (2022.01)

(52) U.S. Cl.
CPC ............ *G06V 40/166* (2022.01); *G06V 30/10* (2022.01); *G06V 40/169* (2022.01)

(58) Field of Classification Search
CPC .... G06V 40/166; G06V 30/10; G06V 40/169; G06V 20/635; G06V 40/161; G06V 40/172; G06V 40/168; G06V 20/46; G06V 40/171; G06V 20/40; G06V 10/82; G06V 40/16; G06V 40/20; G06V 30/413; G06V 40/10; G06V 40/174; G06V 30/153; G06V 30/1478; G06V 2201/07; G06V 20/62; G06V 30/19173; G06V 10/245; G06V 10/40; G06V 10/50; G06V 10/7715; G06V 20/53; G06V 20/63; G06V 20/64; G06V 20/70; G06V 40/1365; G06V 40/173; G06V 40/193; G06V 30/262; G06V 10/764; G06V 10/22; G06V 10/443; G06V 20/625; G06V 2201/02; G06V 20/582; G06V 20/58; G06V 40/165; G06V 20/52; G06V 40/70; G06V 10/10; G06V 20/597; G06V 10/16; G06V 10/761; G06V 40/176; G06V 40/155; G06N 3/08; G06N 3/045; G06N 20/00;

(Continued)

(56) References Cited

U.S. PATENT DOCUMENTS

2007/0200855 A1\* 8/2007 Minagawa ............ A63F 13/577
345/474
2010/0073402 A1\* 3/2010 Delia ...................... G06T 11/60
345/625

(Continued)

*Primary Examiner* — Nimesh Patel
(74) *Attorney, Agent, or Firm* — Amin, Turocy & Watson, LLP

(57) ABSTRACT

A system can determine, from a video of an online session, respective bounding boxes of text names of people, wherein the text names are presented in the video, and wherein images of the people are present in the video. The system can determine, from the video, respective faces of the people. The system can associate a first bounding box of the bounding boxes with a first face of the faces based on the first bounding box satisfying a function of distance with respect to the first face among the faces. The system can extract a name from the first bounding box via optical character recognition. The system can extract a subportion of the video that comprises the first face. The system can store an association between the name and the subportion of the video that comprises the first face.

20 Claims, 12 Drawing Sheets

(58) Field of Classification Search
CPC ............ G06N 3/04; G06N 3/044; G06N 3/02;
G06N 3/0464; G06F 21/32; G06F 18/24;
G06F 16/55; G06F 18/22; G06F
2203/0381; G06F 16/5846; G06F 16/75;
G06F 18/00; G06F 16/50; G06F 40/40;
G06F 18/24765; G06F 21/31; G06F
3/04842; G06F 21/35; G06T 2207/30201;
G06T 13/40; G06T 11/60; G06T 2200/24;
G06T 2207/10016; G06T 2207/30196;
G06T 19/003; G06T 2207/20081; G06T
3/04; G06T 7/246; G06T 11/00; G06T
2207/20084; G06T 7/11; G06T 7/13;
G06T 7/40; G06T 17/00; G06T
2207/20021; G06T 7/174; G06T 7/55;
G06T 7/70; G06T 15/00; G06T
2207/10004; G06T 2207/10072; G06T
2207/10081; G06T 2207/10088; G06T
2207/10136; G06T 7/292; G06T 7/74;
G06T 7/136; G06T 2207/30232; G06T
7/00; G06T 1/00; G06T 3/4046; G06Q
20/384; G06Q 20/02; G06Q 50/01; G06Q
10/06; G06Q 30/0222; G06Q 20/325;
G06Q 20/40145; G06Q 50/265; G06Q
30/0253; G06Q 30/0267; G06Q 30/0239;
H04L 63/105; H04L 63/0823; H04L
63/08; H04L 63/0861; H04W 12/06;
H04W 4/21; H04W 4/80; H04W 12/08
See application file for complete search history.

(56) References Cited

U.S. PATENT DOCUMENTS

2011/0096137 A1\* 4/2011 Baker .................... H04N 7/147
348/E7.083
2019/0266408 A1\* 8/2019 Wang ................... G06V 20/635

\* cited by examiner

900

(902)

↓

DETERMINING, FROM A VIDEO OF AN ONLINE SESSION, RESPECTIVE BOUNDING BOXES OF TEXT NAMES OF PEOPLE, WHEREIN THE TEXT NAMES ARE PRESENTED IN THE VIDEO, AND WHEREIN IMAGES OF THE PEOPLE ARE PRESENT IN THE VIDEO 904

↓

DETERMINING, FROM THE VIDEO, RESPECTIVE FACES OF THE PEOPLE 906

↓

ASSOCIATING A FIRST BOUNDING BOX OF THE BOUNDING BOXES WITH A FIRST FACE OF THE FACES BASED ON THE FIRST BOUNDING BOX SATISFYING A FUNCTION OF DISTANCE WITH RESPECT TO THE FIRST FACE AMONG THE FACES 908

↓

EXTRACTING A NAME FROM THE FIRST BOUNDING BOX VIA OPTICAL CHARACTER RECOGNITION 910

↓

EXTRACTING A SUBPORTION OF THE VIDEO THAT COMPRISES THE FIRST FACE 912

↓

STORING AN ASSOCIATION BETWEEN THE NAME AND THE SUBPORTION OF THE VIDEO THAT COMPRISES THE FIRST FACE 914

EXTRACTING FACIAL IMAGERY FROM ONLINE SESSIONS

BACKGROUND

Online sessions can comprise multi-participant video meetings conducted with computers that communicate across a communications network.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine, from a video of an online session, respective bounding boxes of text names of people, wherein the text names are presented in the video, and wherein images of the people are present in the video. The system can determine, from the video, respective faces of the people. The system can associate a first bounding box of the bounding boxes with a first face of the faces based on the first bounding box satisfying a function of distance with respect to the first face among the faces. The system can extract a name from the first bounding box via optical character recognition. The system can extract a subportion of the video that comprises the first face. The system can store an association between the name and the subportion of the video that comprises the first face.

A method can comprise determining, by a system comprising a processor, and from a video of an online session, respective bounding boxes of text names of people in the video, and respective faces of the people. The method can further comprise associating, by the system, a first bounding box of the bounding boxes with a first face of the faces based on the first bounding box and the first face among the faces satisfying a criterion with respect to distance. The method can further comprise extracting, by the system, a name from the first bounding box via optical character recognition. The method can further comprise extracting, by the system, a portion of the video that comprises the first face. The method can further comprise storing, by the system, an association between the name and the portion of the video that comprises the first face.

An example non-transitory computer-readable medium can comprise instructions that, in response to execution, cause a system comprising a processor to perform operations. These operations can comprise determining, from a video, respective bounding boxes of text names of people in the video, and respective faces of the people. These operations can further comprise associating a first bounding box of the bounding boxes with a first face of the faces based on the first bounding box having a shortest distance with the first face among the faces. These operations can further comprise storing an association between a name that corresponds to the first bounding box and a part of the video that comprises the first face.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 9 illustrates an example process flow that can facilitate extracting facial imagery from online sessions, in accordance with an embodiment of this disclosure;

DETAILED DESCRIPTION

Overview

Virtual meetings (sometimes referred to as online meetings or online sessions) provide an opportunity to garner information from these meetings. For example, there can be voice to text transcription for a virtual meeting. The present techniques can be implemented to extract facial imagery that is bound to people's names. This information can open up opportunities in instruction design, meeting fatigue detection, meeting sentiment analysis, employee/learner engagement analysis, and other fields.

The present techniques can be implemented to bind a recording of a participant in an online session to their name in a tool-agnostic way. This can provide an ability to perform advanced analysis on participants who are attending meetings.

In some examples, the present techniques can be implemented to bind an individual in an online session to their name as a user interface changes during the online session. For example, the user interface can change where a gallery of participants rearranges depending on who is speaking, or who has joined or left the session.

The present techniques can be implemented to determine a distance between quadrilateral edges to bind names to faces. The present techniques can be implemented to leverage a neural network model to detect boxes of names for a purpose of identifying meeting participants' names. The present techniques can be implemented to leverage another neural network model to perform facial detection within an online session.

Example Architectures

Figure 1:
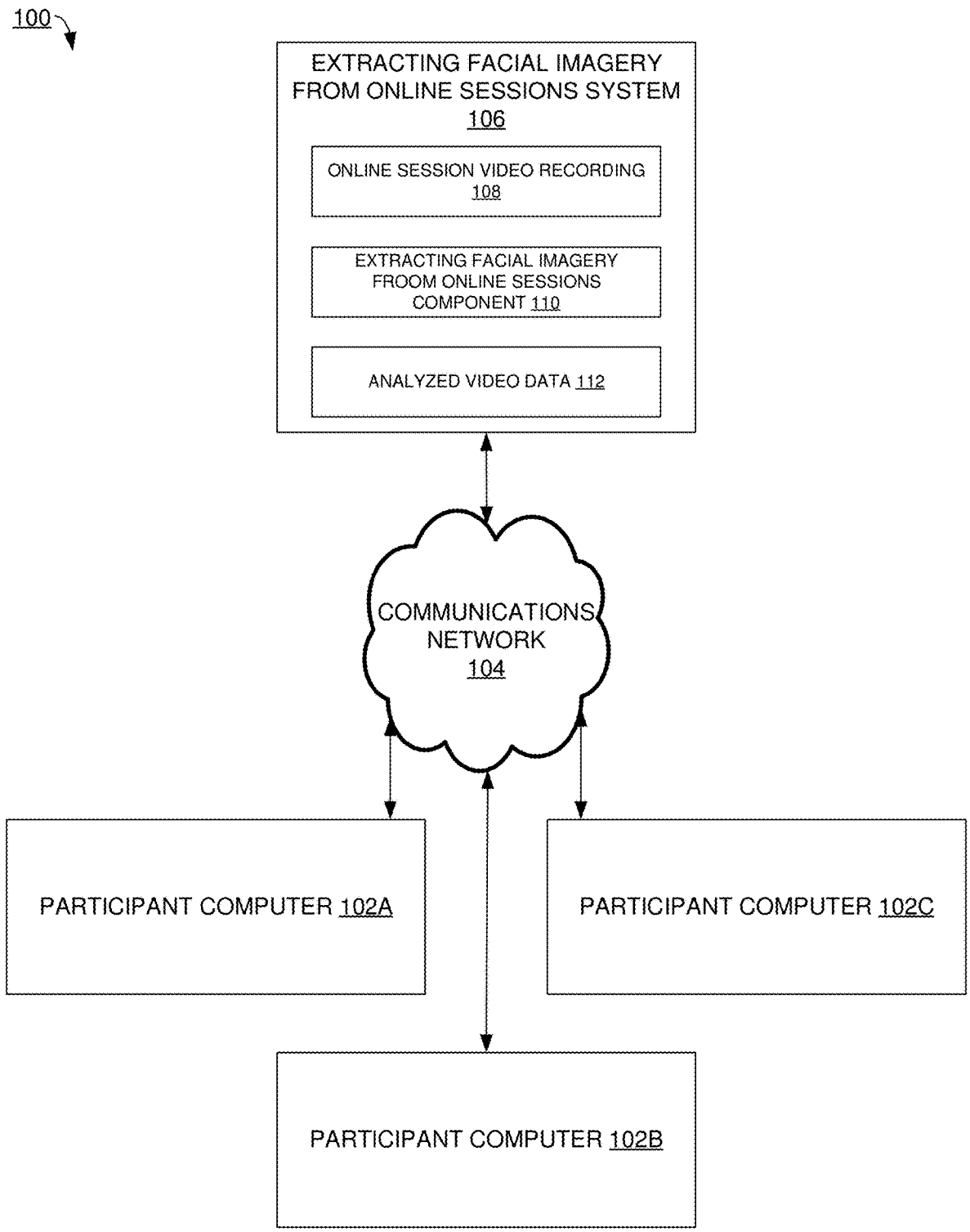
FIG. 1 illustrates an example system architecture that can facilitate extracting facial imagery from online sessions, in accordance with an embodiment of this disclosure.

FIG. 1 illustrates an example system architecture 100 that can facilitate extracting facial imagery from online sessions, in accordance with an embodiment of this disclosure.

System architecture 100 comprises participant computer 102A, participant computer 102B, participant computer 102C, communications network 104, and extracting facial imagery from online sessions system 106. In turn, extracting facial imagery from online sessions system 106 comprises online session video recording 108, extracting facial imagery from online sessions component 110, and analyzed video data 112.

Figure 12:
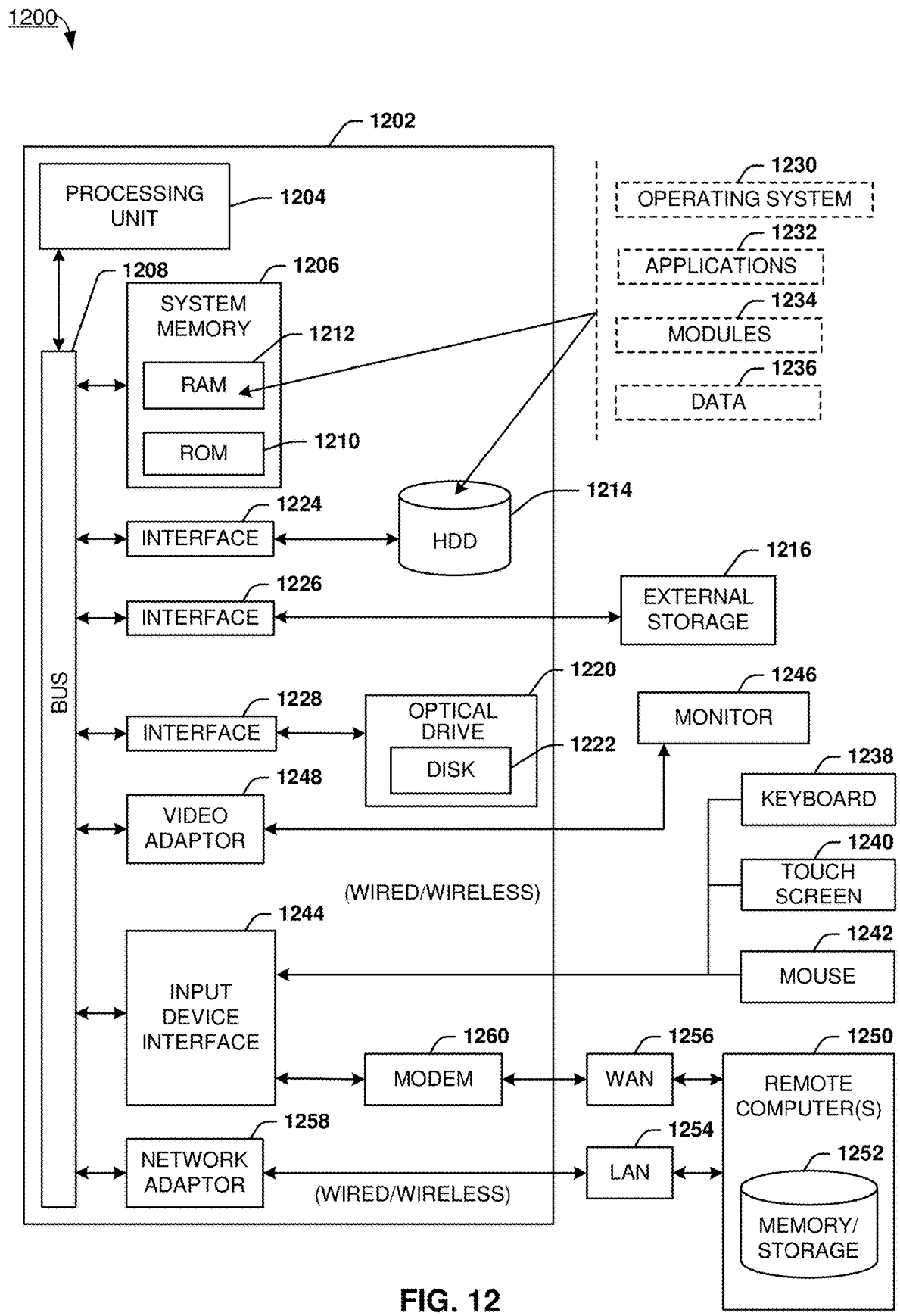
FIG. 12 illustrates an example block diagram of a computer operable to execute an embodiment of this disclosure.

Each of participant computer 102A, participant computer 102B, participant computer 102C, communications network 104, and extracting facial imagery from online sessions system 106 can be implemented with part(s) of computing environment 1200 of FIG. 12. Communications network 104 can comprise a computer communications network, such as the Internet.

Figure 10:
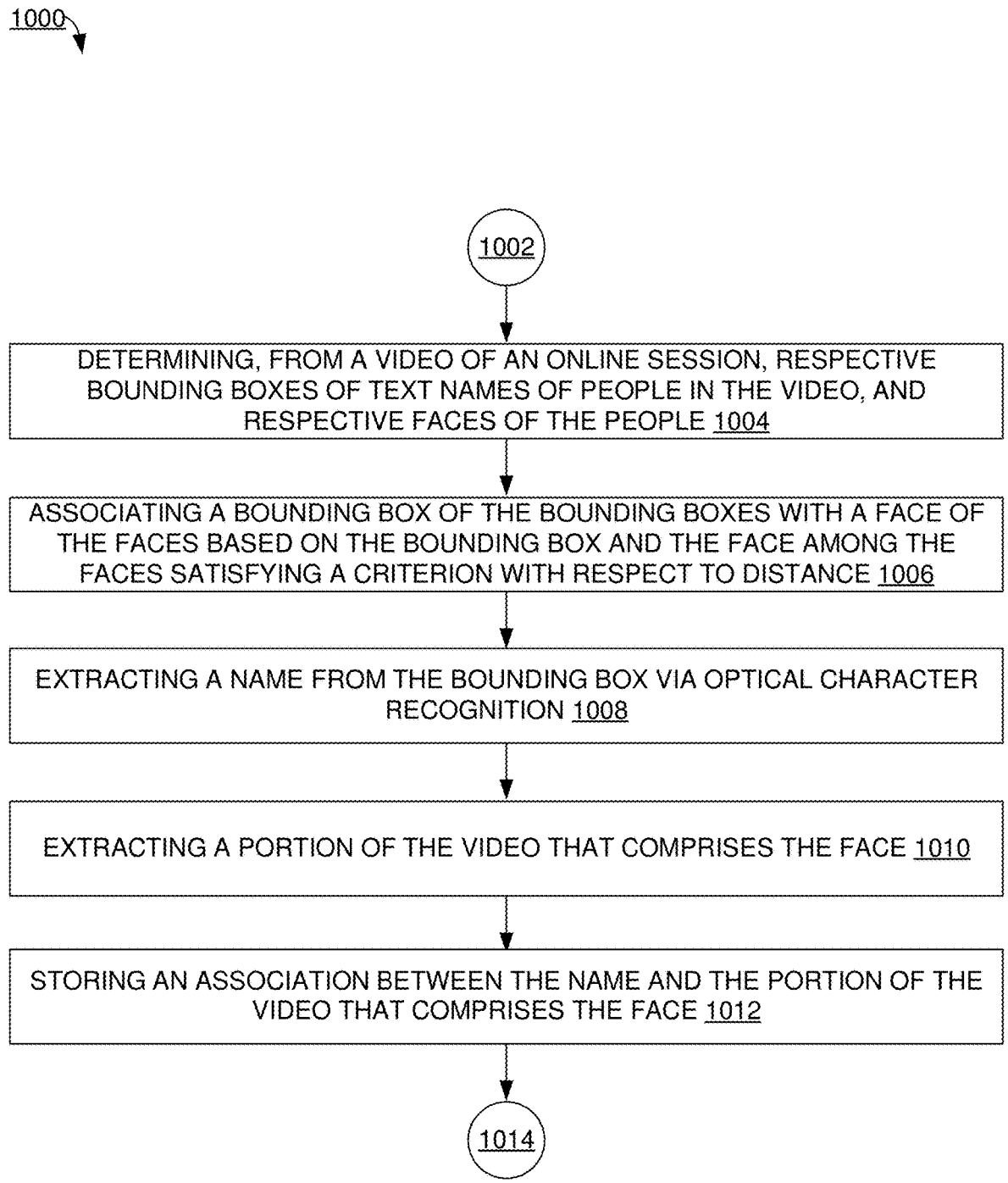
FIG. 10 illustrates another example process flow that can facilitate extracting facial imagery from online sessions, in accordance with an embodiment of this disclosure.
Figure 11:
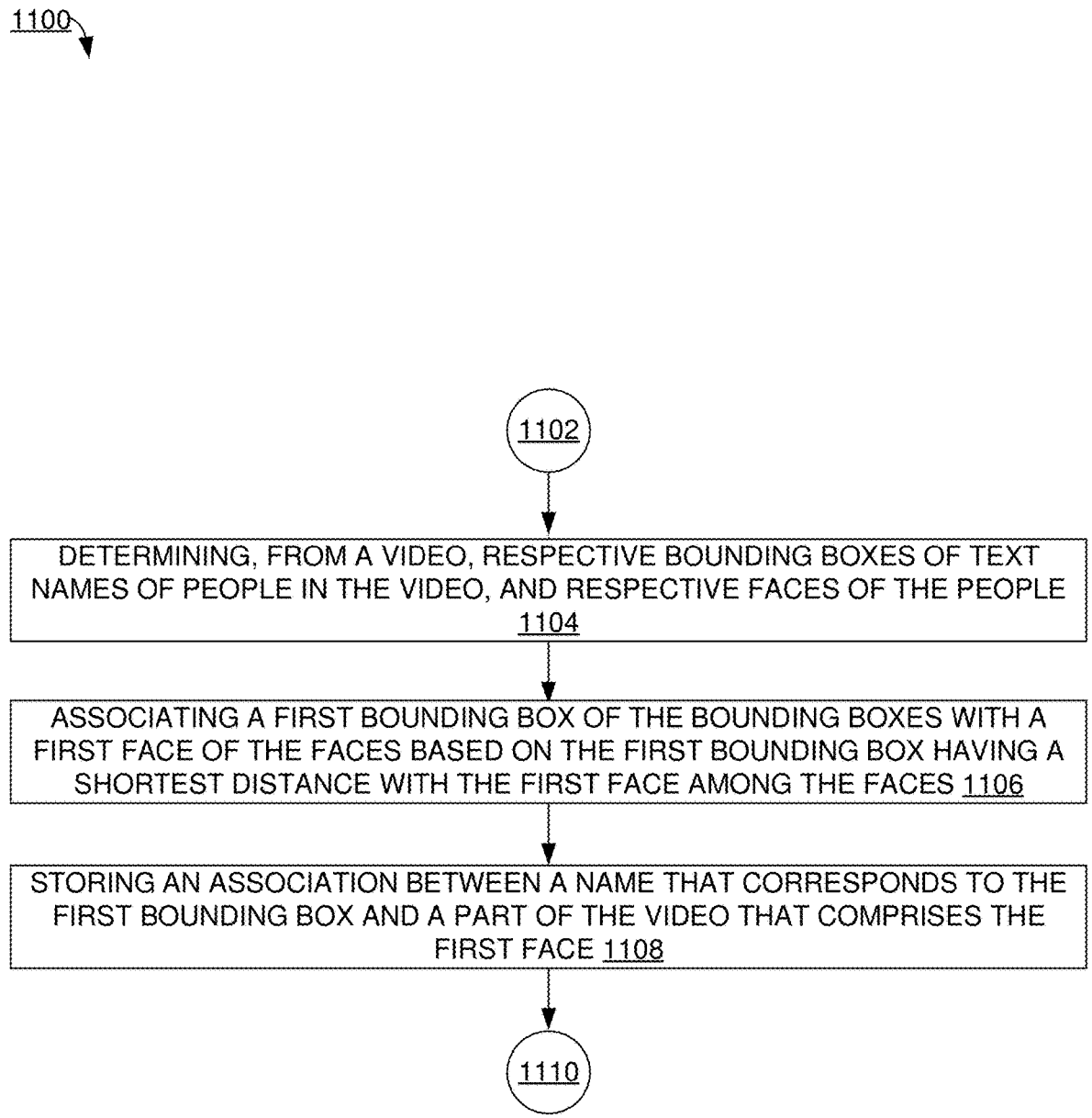
FIG. 11 illustrates another example process flow that can facilitate extracting facial imagery from online sessions, in accordance with an embodiment of this disclosure.

In some examples, extracting facial imagery from online sessions component 110 can implement part(s) of the process flows of FIGS. 9-11 to facilitate extracting facial imagery from online sessions.

Participant computer 102A, participant computer 102B, participant computer 102C can all participate in an online session where users can communicate via video and audio. Participant computer 102A, participant computer 102B, participant computer 102C can communicate via communications network 104. A recording of this online session can be stored as online session video recording 108.

Extracting facial imagery from online sessions component 110 can take online session video recording 108 (or the live online session) and produce analyzed video data 112.

Analyzed video data can include information such as identified faces of participants in the online session, as well as identifications of names of the people whose faces are captured.

It can be appreciated that system architecture 100 is one example system architecture for extracting facial imagery from online sessions, and that there can be other system architectures that facilitate extracting facial imagery from online sessions.

Figure 2:
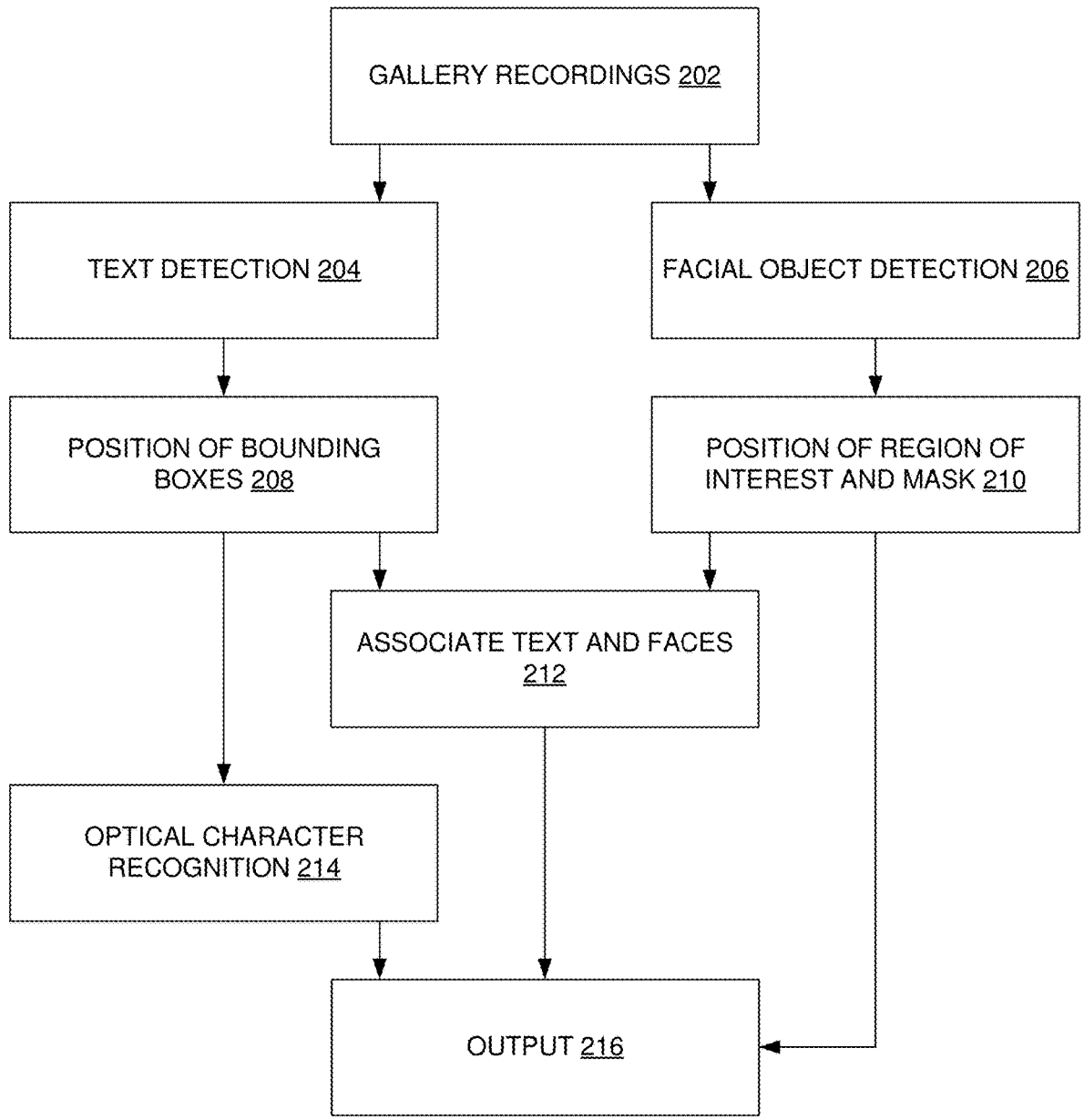
FIG. 2 illustrates another example system architecture that can facilitate extracting facial imagery from online sessions, in accordance with an embodiment of this disclosure.

FIG. 2 illustrates another example system architecture 200 that can facilitate extracting facial imagery from online sessions, in accordance with an embodiment of this disclosure.

In some examples, system architecture 200 can be used to implement extracting facial imagery from online sessions component 110 of FIG. 1.

System architecture 200 comprises gallery recordings 202, text detection 204, facial object detection 206, position of boundary boxes 208, position of region of interest and mask 210, associate text and faces 212, optical character recognition 214, and output 216.

Gallery recordings 202 can be similar to online session video recording 108 of FIG. 1. A recording can be processed in two ways—by text detection 204 and by facial object detection 206. Text detection 204 can identify text in a recording, such as text that identifies a participants' name. Facial object detection 206 can identify the face of a participant in the recording.

Figure 3:
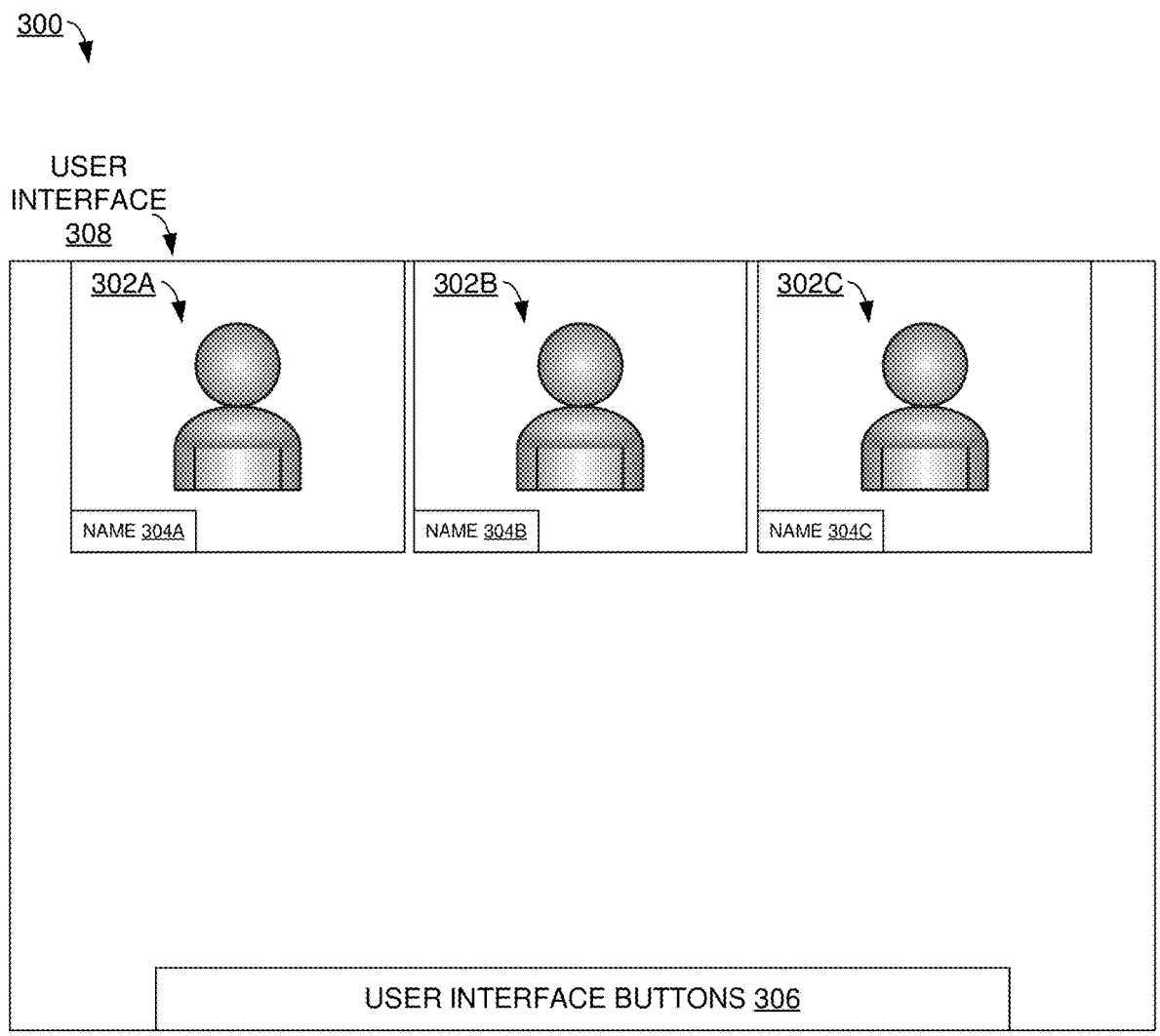
FIG. 3 illustrates an example system architecture that can facilitate extracting facial imagery from online sessions, in accordance with an embodiment of this disclosure.

Text detection 204 can output a position of boundary boxes 208 in frames of a video, such as a bounding box for name 304A of FIG. 3. A position can, for example, identify coordinates within a two-dimensional space that identify the corners of the bounding box.

Facial object detection 206 can output position of region of interest and mask 210 of faces in frames of a video. These can be similar to bounding box 806 and mask 808 of FIG. 8, respectively.

Associate text and faces 212 can take position of boundary boxes 208 and position of region of interest and mask 210 to associate respective texts with respective faces. In some examples, this can be performed in a similar manner as the example of FIG. 6.

Optical character recognition 214 can perform optical character recognition on position of boundary boxes 208 to identify what text is found within those boundary boxes.

The optical character recognition output text from optical character recognition 214, the information on masks and regions of interest of position of region of interest and mask 210, and the associated names and faces from associate text and faces 212 can be combined together as output 216 and stored in computer storage.

Virtual meetings (sometimes referred to as online meetings or online sessions) provide an opportunity to garner information from these meetings. For example, there can be voice to text transcription for a virtual meeting. The present techniques can be implemented to extract facial imagery that is bound to people's names. This information can open up opportunities in instruction design, meeting fatigue detection, meeting sentiment analysis, employee/learner engagement analysis, and other fields.

The present techniques can be implemented to bind a recording of a participant in an online session to their name in a tool-agnostic way. This can provide an ability to perform advanced analysis on participants who are attending meetings.

In some examples, the present techniques can be implemented to bind an individual in an online session to their name as a user interface changes during the online session. For example, the user interface can change where a gallery of participants rearranges depending on who is speaking, or who has joined or left the session.

The present techniques can be implemented to determine a distance between quadrilateral edges to bind names to faces. The present techniques can be implemented to leverage a neural network model to detect boxes of names for a purpose of identifying meeting participants' names. The present techniques can be implemented to leverage another neural network model to perform facial detection within an online session.

Some video conference tools display a name of a participant next to a video of that participant. The present techniques can be implemented to agnostically, across multiple video conferencing tools, read in video of online sessions and extract recordings of an individual's facial expressions bound to their name.

For each frame, a goal can be to identify bounding boxes for faces as well as text of a participant's name. This can be implemented with different neural network models for each of text detection and face detection. The detected text and faces can be associated by identifying a face box among face boxes that is the shortest distance from a given text box. An output can be recorded facial frames of an individual bound to their name.

One step in binding names to faces can be identifying a name, such as in text detection 204. This can be implemented with a neural network model, such as an Efficient and Accurate Scene Text model. In some examples, text detection can comprise creating a bounding box around two separate names—a first name and a last name. When there is overlap between bounding boxes or extremely close proximity between two bounding boxes, these multiple bounding boxes can be treated as a single bounding box, with the farthest ends of the combined bounding box becoming the edges of the combined bounding boxes.

Facial detection can also be performed, such as in facial object detection 206. Techniques such as G-Mask techniques can be used as a neural network model for facial detection, which can be used to determine a bounding box or region of interest (ROI), as well as a mask that is more specifically the facial features of a participant.

Binding names to faces, such as in associate text and faces 212, can be performed as follows. A top right element of a text box (e.g., name 604A of FIG. 6) can be determined, as well as a bottom left element of face bounding boxes (e.g., face bounding box 608A and face bounding box 608B). In some examples, rather than taking corners of shapes, a point can be used that can sometimes be outside of a bounding box (e.g., using the example of FIG. 7). Distances can be evaluated between the text bounding box and the face corners, to find a distance that is shortest. This closest neighbor face can be associated with the closest name. This approach can be implemented using the following pseudocode to generate new points from quadrilaterals to optimize accuracy for distance determination:

$$c_x = \min\{x1, x2, \ldots\}$$
$$c_y = \min\{y1, y2, \ldots\}$$
$$t_x = \max\{x1, x2, \ldots\}$$
$$t_y = \max\{y1, y2, \ldots\}$$
$$Qtext = \{(tx, ty), \ldots, n\}$$
$$Qface = \{(cx, cy), \ldots, n\}$$

closest neighbor =

$$\sum_i^n Qtext_i \sum_j^n \min(Qface_j) \sum_k^n \sqrt{(t_{xk} - c_{xk})^2 - (t_{yk} - c_{yk})^2}.$$

In these equations, $c_x$ represents a set of minimal x coordinates of each quadrilateral; $c_y$ represents a set of minimal y coordinates for each quadrilateral; Oface represents a set of pairs of $c_x$ and $c_y$ where the pairs represent respective coordinates of respective lower left corners of face quadrilaterals; $t_x$ represents a set of maximum X coordinates of each quadrilateral, $t_y$ represents a set of maximum Y coordinates of each quadrilateral; and Otext represents a set of pairs of $t_x$ and $t_y$ where the pairs represent respective coordinates of respective upper right corners of text quadrilaterals.

Maintaining accuracy can be implemented as follows. A risk can arise that text can be identified with the background of an online session. To prevent these text boxes from disrupting an accuracy of the present techniques, metadata in the form of participant names (or employee IDs) can be supplied, such as via single sign-on (SSO) techniques. This approach can provide an ability to match OCR output of text boxes against the metadata to ensure that participant names are being accurately identified.

Optical character recognition can be used to analyzed joined bounding boxes identified, and convert those bounding boxes into digital text that can be used for analysis, such as with optical character recognition 214.

Output 216 can comprise, for each time period, a gallery recording {metadata} & {time stamp, person name, region of interest coordinates, and mask coordinates}.

From this output, a separate application or robotic process automation can leverage the coordinates, timestamps and names to create a file structure as follows:

1. Session Name
   a. Session Metadata
      i. Participant Name
      ii. Individual Gallery Recording
   b. Session Screen Share Recording FIG. 3 illustrates an example system architecture 300 that can facilitate extracting facial imagery from online sessions, in accordance with an embodiment of this disclosure.

System architecture 300 comprises user interface 308 and extracting facial imagery from online sessions component 310. In turn, user interface 308 comprises participant video 302A, name 304A (which can comprise a bounding box for identified text), participant video 302B, name 304B, participant video 302C, name 304C, and user interface buttons 306.

Participant video 302A and name 304A can be the video and screen name of one participant (e.g., a participant using participant computer 102A of FIG. 1). Participant video 302B and name 304B can be the video and screen name of a second participant, and participant video 302C and name 304C can be the video and screen name of a third participant. User interface buttons 306 can comprise user interface elements for participating in an online session, such as ones to mute or unmute participant audio, start or stop participant video, screen share, and leave the online session.

Extracting facial imagery from online sessions component 310 can analyze user interface 308 to identify faces and corresponding names of participants.

Figure 4:
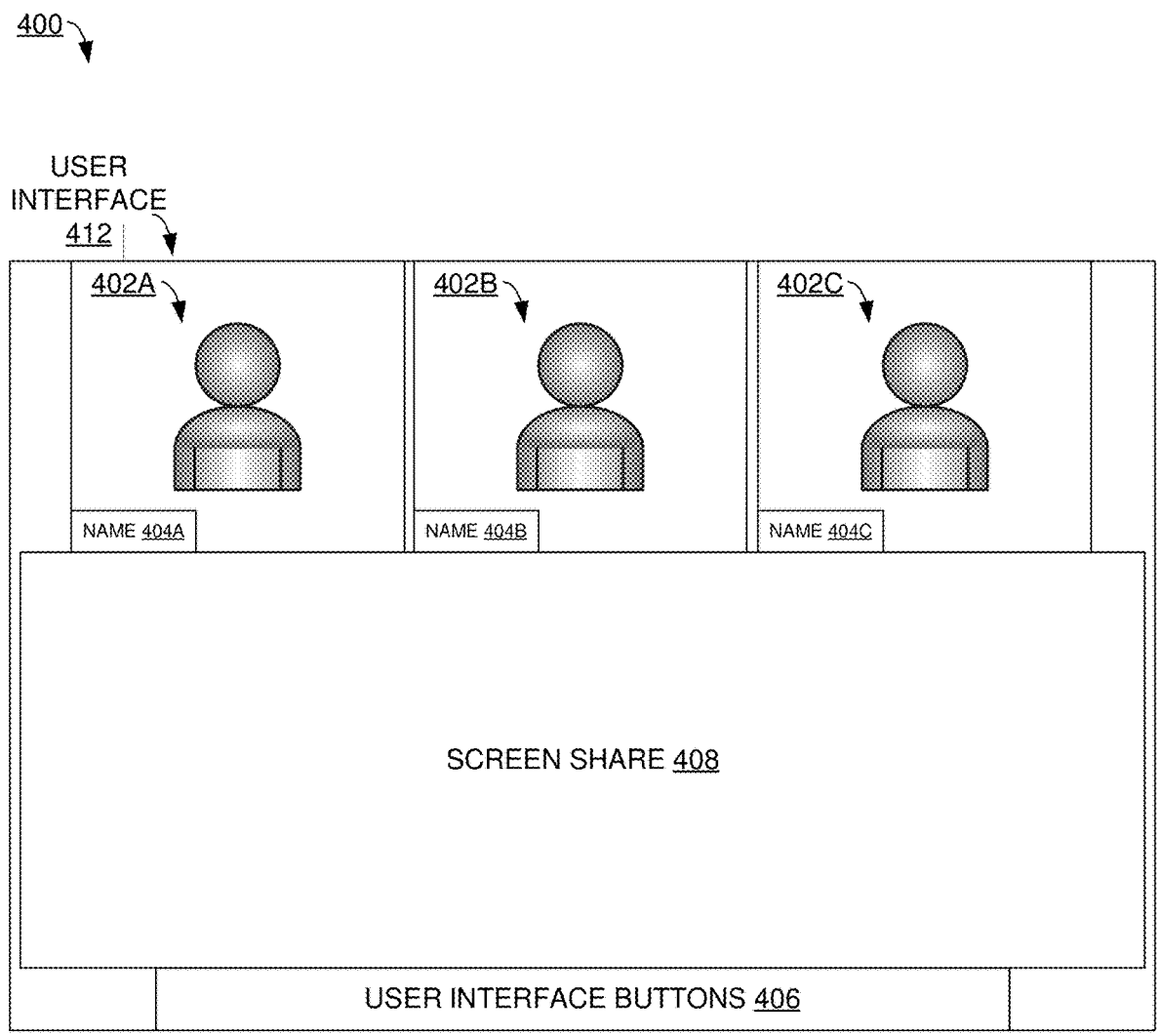
FIG. 4 illustrates another example system architecture that can facilitate extracting facial imagery from online sessions, in accordance with an embodiment of this disclosure.

FIG. 4 illustrates another example system architecture 400 that can facilitate extracting facial imagery from online sessions, in accordance with an embodiment of this disclosure.

System architecture 400 comprises user interface 412 and extracting facial imagery from online sessions component 410. In turn, user interface 412 comprises participant video 402A, name 404A, participant video 402B, name 404B, participant video 402C, name 404C, user interface buttons 406, and screen share 408. User interface 412 can be similar to user interface 308 of FIG. 3, and participant video 402A, name 404A, participant video 402B, name 404B, participant video 402C, name 404C, and user interface buttons 406 can be similar to participant video 302A, name 304A, participant video 302B, name 304B, participant video 302C, name 304C, and user interface buttons 306. Extracting facial imagery from online sessions component 410 can be similar to extracting facial imagery from online sessions component 310.

Screen share 408 can comprise an image of one participant's computer screen that is shared with other participants in the online session. In some examples, screen share 408 comprises text, which can be analyzed, determined that it does not identify a participant's name, and disregarded for the purpose of associating participant faces with participant names.

User interface 412 and user interface 308 of FIG. 3 differ, though the present techniques can be applied to each user interface to extract and associate participant names and faces. It can be appreciated that the present techniques can be applied to yet more different user interfaces that arrange participant videos, participant names, and other user interface elements in different ways.

Extracting facial imagery from online sessions component 410 can analyze user interface 412 to identify faces and corresponding names of participants.

Figure 5:
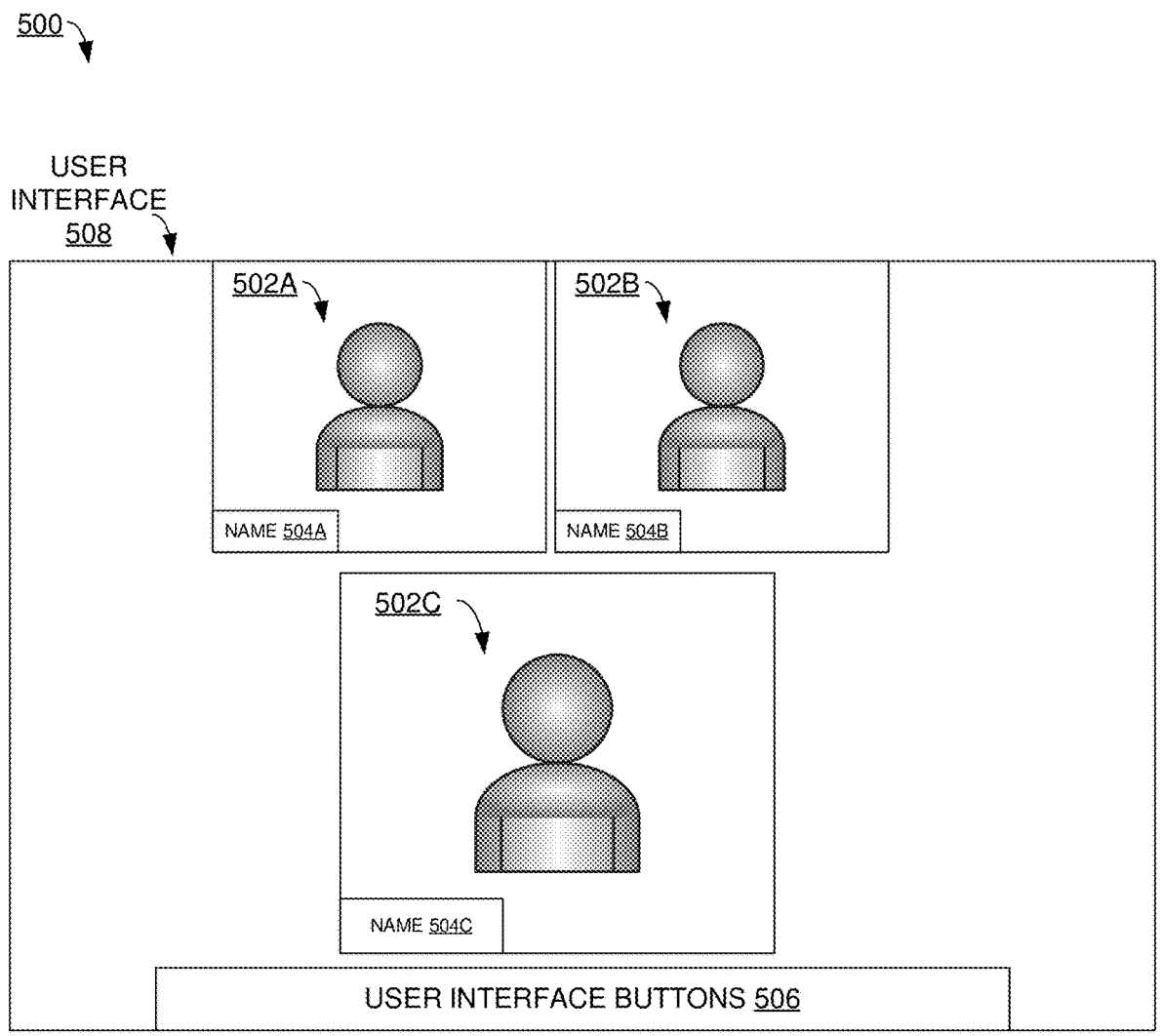
FIG. 5 illustrates another example system architecture that that changes in response to user action, and that can facilitate extracting facial imagery from online sessions, in accordance with an embodiment of this disclosure.

FIG. 5 illustrates another example system architecture 500 that that changes in response to user action, and that can facilitate extracting facial imagery from online sessions, in accordance with an embodiment of this disclosure.

System architecture 500 comprises user interface 508 and extracting facial imagery from online sessions component 510. In turn, user interface 508 comprises participant video 502A, name 504A, participant video 502B, name 504B, participant video 502C, name 504C, and user interface buttons 506. User interface 512 can be similar to user interface 308 of FIG. 3, and participant video 502A, name 504A, participant video 502B, name 504B, participant video 502C, name 504C, and user interface buttons 506 can be similar to participant video 302A, name 304A, participant video 302B, name 304B, participant video 302C, name 304C, and user interface buttons 306. Extracting facial imagery from online sessions component 510 can be similar to extracting facial imagery from online sessions component 310.

In user interface 508, the speaker can be highlighted. As depicted in user interface 508, the speaker is associated with participant video 502C (And name 504C). When another participant speaks (e.g., the speaker is in participant video 502A), user interface 508 can re-arrange so that participant video 502A takes the spot of participant video 502C in the middle of user interface 508 (and name 504A takes the spot of name 504C). Then, participant video 502C and name 504C can be moved up to where participant video 502A and name 504A are currently located.

It can be appreciated that the present techniques can be applied to a user interface that changes during an online session, such as a user interface that changes in this manner where the speaker is highlighted in the middle of user interface 508.

Extracting facial imagery from online sessions component 510 can analyze user interface 508 to identify faces and corresponding names of participants.

Figure 6:
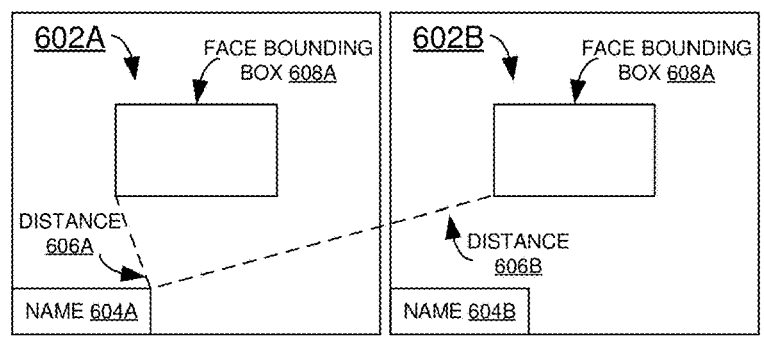
FIG. 6 illustrates an example system architecture of determining closest corners that can facilitate extracting facial imagery from online sessions, in accordance with an embodiment of this disclosure.

FIG. 6 illustrates an example system architecture 600 of determining closest corners that can facilitate extracting facial imagery from online sessions, in accordance with an embodiment of this disclosure.

System architecture 600 comprises participant video 602A, name 604A, participant video 602B, name 604B, distance 606A, distance 606B, face bounding box 608A, face bounding box 608B, and extracting facial imagery from online sessions component 610. Participant video 602A, name 604A, participant video 602B, name 604B, and extracting facial imagery from online sessions component 610 can be similar to participant video 302A, name 304A, participant video 302B, name 304B, and extracting facial imagery from online sessions component 310 of FIG. 3, respectively.

Figure 8:
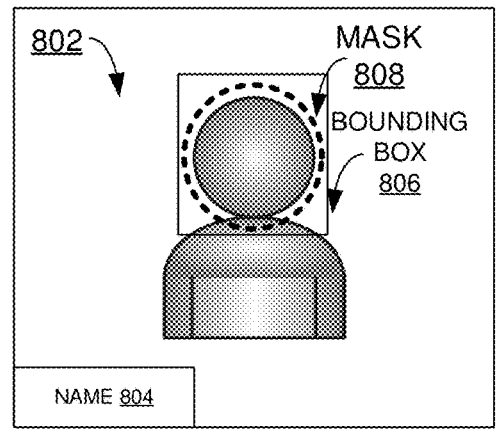
FIG. 8 illustrates an example system architecture of determining a bounding box and a mask for a face, and that can facilitate extracting facial imagery from online sessions, in accordance with an embodiment of this disclosure.

Face bounding box 608A and face bounding box 608B can each be similar to an instance of bounding box 806 of FIG. 8.

Extracting facial imagery from online sessions component 610 can determine which face to associate with name 604A. Here, extracting facial imagery from online sessions component 610 determines respective distances from an upper right corner of name 604A to a lower left corner of face bounding box 608A and face bounding box 608B, to produce distance 606A and distance 606B. Extracting facial imagery from online sessions component 610 determines that distance 606A is less than distance 606B, so associates name 604A with face bounding box 608A.

It can be appreciated that different techniques can be applied to associate names with faces, in addition to the technique of the example of FIG. 6.

Figure 7:
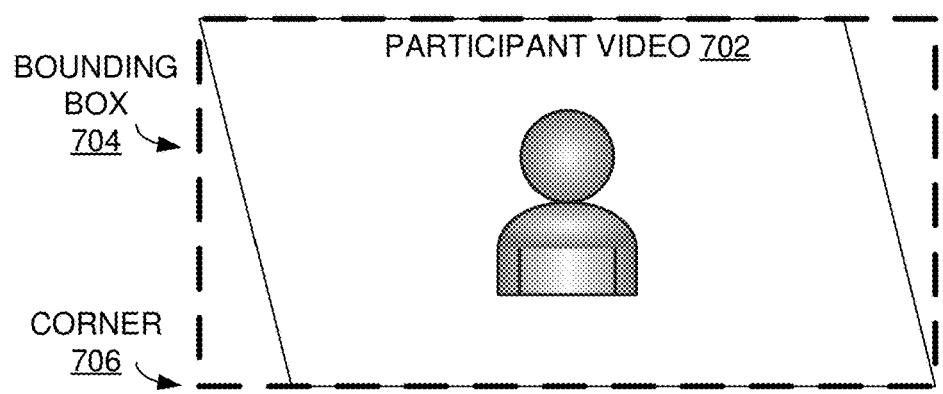
FIG. 7 illustrates an example system architecture that can facilitate extracting facial imagery from online sessions, in accordance with an embodiment of this disclosure.

FIG. 7 illustrates an example system architecture 700 that can facilitate extracting facial imagery from online sessions, in accordance with an embodiment of this disclosure.

System architecture 700 comprises participant video 702 (which can be similar to participant video 302A of FIG. 3), bounding box 704, corner 706, and extracting facial imagery from online sessions component 710 (which can be similar to extracting facial imagery from online sessions component 310 of FIG. 3).

In some examples, a participant video is not rectangular, such as with participant video 702. In such cases, it can be that bounding box 704 is still rectangular. Thus, a lower left corner of bounding box—here, corner 706—can be found outside of the participant video, though still used for a purpose of associating names and faces, such as using the example of FIG. 6.

That is, in a case where a quadrilateral is not a perfect rectangle, there can exist a risk that, for example, an upper right corner of a text box and a lower left corner of a face box are in positions that do not minimize a difference between the two quadrilaterals. To mitigate against this possibility, a farthest point to the right and a highest point can be combined to create a position that represents a top right corner. Similarly, a bottom left corner can be established by taking a lowest point and a farthest left point. Then, the distance between these two points can be evaluated rather than corners to address a case of odd-shaped quadrilaterals.

FIG. 8 illustrates an system architecture 800 of determining a bounding box and a mask for a face, and that can facilitate extracting facial imagery from online sessions, in accordance with an embodiment of this disclosure.

System architecture 800 comprises participant video 802, name 804, bounding box 806, mask 808, and extracting facial imagery from online sessions component 810. Participant video 802, name 804, and extracting facial imagery from online sessions component 810 can be similar to participant video 302A, name 304B, and extracting facial imagery from online sessions component 310, respectively.

Extracting facial imagery from online sessions component 810 can process participant video 802 to determine both bounding box 806 and mask 808 for a participant's face. A region of interest can generally comprise a rectangular region of a video that is larger than a mask, and a mask can generally comprise a non-rectangular object that more tightly captures a participant's face relative to a region of interest.

Extracting facial imagery from online sessions component 810 can determine and store both bounding box 806 and mask 808 in the course of extracting facial imagery from online sessions.

Example Process Flows

FIG. 9 illustrates an example process flow that can facilitate extracting facial imagery in online sessions, in accordance with an embodiment of this disclosure. In some examples, one or more embodiments of process flow 900 can be implemented by extracting facial imagery from online sessions system 106 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 1000 of FIG. 10, and/or process flow 1100 of FIG. 11.

Process flow 900 begins with 902, and moves to operation 904. Operation 904 depicts determining, from a video of an online session, respective bounding boxes of text names of people, wherein the text names are presented in the video, and wherein images of the people are present in the video. That is, there can be an online video session with multiple participants. The participants can have a video of their face, as well as a text name displayed.

After operation 904, process flow 900 moves to operation 906.

Operation 906 depicts determining, from the video, respective faces of the people. That is, faces within the video can be identified.

After operation 906, process flow 900 moves to operation 908.

Operation 908 depicts associating a bounding box of the bounding boxes with a face of the faces based on the bounding box satisfying a function of distance with respect to the face among the faces. That is, names and faces in the video can be paired together, such as by pairing, for a name, the face that has a lower left corner that is closest to an upper right corner for that text name.

In some examples, the bounding box satisfying the function of distance comprises the bounding box having a shortest distance with respect to the face among the faces, and wherein the shortest distance is measured between an upper right element of the bounding box and a lower left element of the face.

After operation 908, process flow 900 moves to operation 910.

Operation 910 depicts extracting a name from the bounding box via optical character recognition. That is, optical character recognition can be applied to the video to determine what the name is in text.

After operation 910, process flow 900 moves to operation 912.

Operation 912 depicts extracting a subportion of the video that comprises the face. That is, the face (or, e.g., a rectangular bounding box of the face) can be extracted from the video.

After operation 912, process flow 900 moves to operation 914.

Operation 914 depicts storing an association between the name and the subportion of the video that comprises the face. That is, the name and face can be stored together in computer memory.

In some examples, operation 914 comprises determining that a first user interface location of the bounding box has changed in the video to a new first user interface location, determining that a second user interface location of the face has changed in the video to a new second user interface location, and associating the bounding box at the new first user interface location with the face at the second user interface location. That is, a gallery of an online session user interface can rearrange itself over time, and faces can be tracked and associated with names as the user interface changes.

In some examples, the second user interface location of the face has changed in the video to the new second user interface location based on a determination that a user account previously joined in the online session has signed out of participating in the online session. That is, faces and names in a user interface can be re-arranged as participants join or leave an online session.

In some examples, the second user interface location of the face has changed in the video to the new second user interface location based on a change in user account of the online session associated with a person speaking in the online session. That is, a person speaking in an online session can be highlighted, such as having his or her face and name moved to a particular location within a user interface (and other faces and names moved around in view of that).

In some examples, the bounding box satisfying the function of distance comprises the bounding box having a first shortest distance with respect to the face among the faces, the video is a first video created with a first online session program, the bounding box is a first bounding box, the face is a first face, the association is a first association, the images are first images, and the subportion is a first subportion. In such examples, operation 914 can comprise determining, from a second video of a second online session created with a second online session program, respective second bounding boxes of text names of second people, wherein second images of the second people are present in the second video; associating a second bounding box of the respective second bounding boxes with a second face of the second people based on the second bounding box having a second shortest distance with the second face among the second images of the second people; extracting a second name from the second bounding box via optical character recognition; extracting a second subportion of the second video that comprises the second face; and storing a second association between the second name and the second subportion of the second video that comprises the second face. That is, the present techniques can be applied agnostically across multiple video conferencing tools, and can function with a first online session program and a different, second online session program that each display different user interfaces.

In some examples, the association is a first association, and operation 914 comprises storing respective associations between respective text names of the text names and respective people of the people for respective frames of the video. That is, for each frame of video, bounding boxes for faces as well as text of a corresponding user name can be identified.

After operation 914, process flow 900 moves to 916, where process flow 900 ends.

FIG. 10 illustrates another example process flow that can facilitate extracting facial imagery in online sessions, in accordance with an embodiment of this disclosure. In some examples, one or more embodiments of process flow 1000 can be implemented by extracting facial imagery from online sessions system 106 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 900 of FIG. 9, and/or process flow 1100 of FIG. 11.

Process flow 1000 begins with 1002, and moves to operation 1004. Operation 1004 depicts determining, from a video of an online session, respective bounding boxes of text names of people in the video, and respective faces of the people. In some examples, operation 1004 can be implemented in a similar manner as operations 904-906 of FIG. 9.

In some examples, determining the respective faces of the people comprises determining the bounding box of the face and a mask of the face, wherein the mask covers the face, and wherein the mask is contained within the bounding box, and where storing the association between the name and the portion of the video that comprises the face comprises storing the bounding box of the face and the mask of the face. That is, both a bounding box and a mask can be determined for a face in a frame of a video. For example, a bounding box or region of interest can be determined that includes the face, as well as a smaller mask that is more focused on the face relative to the bounding box or region of interest.

In some examples, the name is a first name, and operation 1004 comprises determining stored participant names of participants in the online session, the stored participant names being separate from the video; determining that a second name of the text names is not identified in the stored participant names; and omitting from associating the second name with the faces. That is, there can be text in an online session that is not a participant's name. For example, a participant can be seated in front of a white board, on which words have been written. Non-name text can be identified (such as by comparing text against a list of participants in the online session), and disregarded so that this non-name text is not paired with a face.

After operation 1004, process flow 1000 moves to operation 1006.

Operation 1006 depicts associating a bounding box of the bounding boxes with a face of the faces based on the bounding box and the face among the faces satisfying a criterion with respect to distance. In some examples, operation 1006 can be implemented in a similar manner as operation 908 of FIG. 9.

In some examples, operation 1006 comprises determining a group of bounding box information, respective bounding box information of the group of bounding box information comprising respective first timestamps, respective first sources, and respective coordinates within the video; and determining a group of face information, respective face information of the group of face information comprising respective second timestamps within the video, respective second coordinates within the video, and respective masks. In such examples, operation 906 can comprise associating a first timestamp of the respective first timestamps of the group of bounding box information with a second timestamp of the respective second timestamps of the group of face information. That is, certain information can be extracted from text detection of a video (e.g., names), other information can be extracted from facial detection of the video (e.g., faces), and then these two outputs can be combined to associate names with faces.

In some examples, the association between the name and the portion of the video that comprises the face comprises a timestamp, the name, a location of the face in the video, and a mask. That is, these things can be determined based on extracting a name and a face from a video.

In some examples, the distance is a first distance, the predetermined threshold value is a first predetermined threshold value, and operation 1006 comprises determining a predetermined location relative to the face, and associating the bounding box with the face based on the bounding box predetermined location relative to the face satisfying the criterion with respect to distance. That is, names and faces can be associated based on predetermined locations of the names and faces. For example, it can be that an upper right corner of a bounding box associated with a name is compared against lower left corners of bounding boxes associated with faces. And the shortest distance between the name bounding box and a face bounding box can indicate the face bounding box to associate with that name bounding box.

After operation 1006, process flow 1000 moves to operation 1008.

Operation 1008 depicts extracting a name from the bounding box via optical character recognition. In some examples, operation 1008 can be implemented in a similar manner as operation 910 of FIG. 9.

After operation 1008, process flow 1000 moves to operation 1010.

Operation 1010 depicts extracting a portion of the video that comprises the face. In some examples, operation 1010 can be implemented in a similar manner as operation 912 of FIG. 9.

After operation 1010, process flow 1000 moves to operation 1012.

Operation 1012 depicts storing an association between the name and the portion of the video that comprises the face. In some examples, operation 1012 can be implemented in a similar manner as operation 914 of FIG. 9.

In some examples, operation comprises determining stored participant names of participants in the online session, the stored participant names being separate from the video; updating the name based on the name being different from the stored participant names, to produce an updated name, and storing the updated name. That is, information on participants (e.g., employee records where the online session is conducted within a company) can be used to update a name. For example, a participant may login to the online session as "Jon Doe" and that name can be updated to "Jonathan Doe" based on the corresponding employee record identifying the person's first name as Jonathan.

After operation 1012, process flow 1000 moves to 1014, where process flow 1000 ends.

FIG. 11 illustrates another example process flow that can facilitate extracting facial imagery in online sessions, in accordance with an embodiment of this disclosure. In some examples, one or more embodiments of process flow 1100 can be implemented by extracting facial imagery from online sessions system 106 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 900 of FIG. 9, and/or process flow 1000 of FIG. 10.

Process flow 1100 begins with 1102, and moves to operation 1104. Operation 1104 depicts determining, from a video, respective bounding boxes of text names of people in the video, and respective faces of the people. In some examples, operation 1104 can be implemented in a similar manner as operations 904-906 of FIG. 9.

In some examples, operation 1104 comprises determining the respective faces using a convolutional neural network. In some examples, operation 1104 comprises determining the respective bounding boxes of text names of the people in the video using a fully convolutional network.

In some examples, operation 1104 comprises determining the respective faces using a first neural network, and determining the respective bounding boxes of text names of the people in the video using a second neural network, wherein the first neural network differs from the second neural network. That is, two different types of neural networks can be used to perform text detection and facial detection, respectively.

After operation 1104, process flow 1100 moves to operation 1106.

Operation 1106 depicts associating a bounding box of the bounding boxes with a face of the faces based on the bounding box having a shortest distance with the face among the faces. In some examples, operation 1106 can be implemented in a similar manner as operation 908 of FIG. 9.

After operation 1106, process flow 1100 moves to operation 1108.

Operation 1108 depicts storing an association between a name that corresponds to the bounding box and a part of the video that comprises the face. In some examples, operation 1108 can be implemented in a similar manner as operations 910-914 of FIG. 9.

In some examples, operation 1108 comprises extracting the name from the bounding box via optical character recognition before storing the association. In some examples, operation 1108 comprises extracting the part of the video that comprises the face before storing the association.

After operation 1108, process flow 1100 moves to 1108, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of participant computer 102A, participant computer 102B, participant computer 102C, and/or extracting facial imagery from online sessions system 106 of FIG. 1.

In some examples, computing environment 1200 can implement one or more embodiments of the process flows of FIGS. 9-11 to facilitate extracting facial imagery from online sessions.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/ output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory that stores executable instructions that, when executed by the at least one processor, facilitate performance of operations, comprising:
      determining, from a video of an online session, respective bounding boxes of text names of people, wherein the text names are presented in the video, and wherein images of the people are present in the video;
      determining, from the video, respective faces of the people;
      associating a bounding box of the bounding boxes with a face of the faces based on the bounding box satisfying a function of distance with respect to the face among the faces based on the bounding box having a shortest distance with respect to the face among the faces, and wherein the shortest distance is measured between an upper right element of the bounding box and a lower left element of the face;
      extracting a name from the bounding box via optical character recognition;
      extracting a subportion of the video that comprises the face; and
      storing an association between the name and the subportion of the video that comprises the face.

2. The system of claim 1, wherein the operations further comprise:
   determining that a first user interface location of the bounding box has changed in the video to a new first user interface location;
   determining that a second user interface location of the face has changed in the video to a new second user interface location; and
   associating the bounding box at the new first user interface location with the face at the second user interface location.

3. The system of claim 2, wherein the second user interface location of the face has changed in the video to the new second user interface location based on a determination that a user account previously joined in the online session has signed out of participating in the online session.

4. The system of claim 2, wherein the second user interface location of the face has changed in the video to the new second user interface location based on a change in user account of the online session associated with a person speaking in the online session.

5. The system of claim 1, wherein the bounding box satisfying the function of distance comprises the bounding box having a first shortest distance with respect to the face among the faces, wherein the video is a first video created with a first online session program, wherein the bounding box is a first bounding box, wherein the face is a first face, wherein the association is a first association, wherein the images are first images, wherein the subportion is a first subportion, and wherein the operations further comprise:
   determining, from a second video of a second online session created with a second online session program, respective second bounding boxes of text names of second people, wherein second images of the second people are present in the second video;
   associating a second bounding box of the respective second bounding boxes with a second face of the second people based on the second bounding box having a second shortest distance with the second face among the second images of the second people;
   extracting a second name from the second bounding box via optical character recognition;
   extracting a second subportion of the second video that comprises the second face; and
   storing a second association between the second name and the second subportion of the second video that comprises the second face.

6. The system of claim 1, wherein the association is a first association, and wherein the operations further comprise:
   storing respective associations between respective text names of the text names and respective people of the people for respective frames of the video.

7. A method, comprising:
   determining, by a system comprising at least one processor, and from a video of an online session, respective bounding boxes of text names of people, wherein the text names are presented in the video, and wherein images of the people are present in the video;

determining, by the system and from the video, respective faces of the people;

associating, by the system, a bounding box of the bounding boxes with a face of the faces based on the bounding box satisfying a criterion of distance with respect to the face among the faces based on the bounding box having a shortest distance with respect to the face among the faces, and wherein the shortest distance is measured between an upper right element of the bounding box and a lower left element of the face;

extracting, by the system, a name from the bounding box via optical character recognition;

extracting, by the system, a subportion of the video that comprises the face; and storing, by the system, an association between the name and the subportion of the video that comprises the face.

8. The method of claim 7, further comprising:

determining, by the system, a group of bounding box information, respective bounding box information of the group of bounding box information comprising respective first timestamps, respective first sources, and respective coordinates within the video; and determining, by the system, a group of face information, respective face information of the group of face information comprising respective second timestamps within the video, respective second coordinates within the video, and respective masks, wherein associating the bounding box with the face is based on associating a first timestamp of the respective first timestamps of the group of bounding box information with a second timestamp of the respective second timestamps of the group of face information.

9. The method of claim 7, wherein the association between the name and the portion of the video that comprises the face comprises a timestamp, the name, a location of the face in the video, and a mask.

10. The method of claim 7, wherein determining the respective faces of the people comprises:

determining, by the system, the bounding box of the face and a mask of the face, wherein the mask covers the face, and wherein the mask is contained within the bounding box; and wherein storing the association between the name and the portion of the video that comprises the face comprises storing, by the system, the bounding box of the face and the mask of the face.

11. The method of claim 7, further comprising:

determining, by the system, stored participant names of participants in the online session, the stored participant names being separate from the video; and updating, by the system, the name based on the name being different from the stored participant names, to produce an updated name, wherein storing the association comprises storing, by the system, the updated name.

12. The method of claim 7, wherein the name is a first name, and further comprising:

determining, by the system, stored participant names of participants in the online session, the stored participant names being separate from the video;

determining, by the system, that a second name of the text names is not identified in the stored participant names; and omitting, by the system, from associating the second name with the faces.

13. The method of claim 7, wherein the distance is a first distance, and further comprising:

determining, by the system, a predetermined location relative to the face; and associating, by the system, the bounding box with the face based on the bounding box predetermined location relative to the face satisfying the criterion with respect to distance.

14. A non-transitory computer-readable medium comprising instructions that, in response to execution, cause a system comprising a processor to perform operations, comprising:

determining, from a video of an online session, respective bounding boxes of text names of people, wherein the text names are presented in the video, and wherein images of the people are present in the video;

determining, from the video, respective faces of the people;

associating a bounding box of the bounding boxes with a face of the faces based on the bounding box satisfying a function of distance with respect to the face among the faces based on the bounding box having a shortest distance with respect to the face among the faces, and wherein the shortest distance is measured between an upper right element of the bounding box and a lower left element of the face;

extracting a name from the bounding box via optical character recognition;

extracting a subportion of the video that comprises the face; and storing an association between the name and the subportion of the video that comprises the face.

15. The non-transitory computer-readable medium of claim 14, wherein the operations further comprise:

extracting the name from the bounding box via optical character recognition before storing the association.

16. The non-transitory computer-readable medium of claim 14, wherein the operations further comprise:

extracting the part of the video that comprises the face before storing the association.

17. The non-transitory computer-readable medium of claim 14, wherein the operations further comprise:

determining the respective faces using a convolutional neural network.

18. The non-transitory computer-readable medium of claim 14, wherein the operations further comprise:

determining the respective bounding boxes of text names of the people in the video using a fully convolutional network.

19. The non-transitory computer-readable medium of claim 14, wherein the operations further comprise:

determining the respective faces using a first neural network; and determining the respective bounding boxes of text names of the people in the video using a second neural network, wherein the first neural network differs from the second neural network.

20. The non-transitory computer-readable medium of claim 14, wherein the operations further comprise:

determining that a first user interface location of the bounding box has changed in the video to a new first user interface location;

determining that a second user interface location of the face has changed in the video to a new second user interface location; and associating the bounding box at the new first user interface location with the face at the second user interface location.

\* \* \* \* \*